US012223857B2
US 12,223,857 B2
Feb. 11, 2025

(12) United States Patent
Sekine (10) Patent No.: US 12,223,857 B2
(45) Date of Patent: Feb. 11, 2025

(54) SYSTEM THAT CAUSES SHARER TO DETECT INFORMATION REGARDING ANSWER SECTION INPUT DURING SCREEN SHARING

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 79 days.

(21) Appl. No.: 18/019,089

(22) PCT Filed: Dec. 28, 2021

(86) PCT No.: PCT/JP2021/048761
§ 371 (c)(1),
(2) Date: Jan. 31, 2023

(87) PCT Pub. No.: WO2022/254766
PCT Pub. Date: Dec. 8, 2022

(65) Prior Publication Data
US 2023/0335002 A1 Oct. 19, 2023

(30) Foreign Application Priority Data

Jun. 4, 2021 (JP) ................................. 2021-094704

(51) Int. Cl.
*G06F 3/0481* (2022.01)
*G09B 7/073* (2006.01)
(52) U.S. Cl.
CPC ........... *G09B 7/073* (2013.01); *G06F 3/0481* (2013.01)

(58) Field of Classification Search
CPC .. G06F 3/0481; G06F 15/17337; G09B 7/073
See application file for complete search history.

(56) References Cited

FOREIGN PATENT DOCUMENTS

JP    2011-232934 A    11/2011
JP    2012-003667    *    1/2012
(Continued)

OTHER PUBLICATIONS

International Search Report of International Patent Application No. PCT/JP2021/048761 completed on Feb. 16, 2022 and mailed March 1. 2022 (4 pages).

(Continued)

*Primary Examiner* — Lisa S Landis
(74) *Attorney, Agent, or Firm* — Pyprus Pte Ltd; George D. Liu (57) ABSTRACT

[Problem] To provide a system with which, when an input is made on one terminal in one answer section of a questionnaire, information regarding a question item corresponding to the above-described answer section is displayed on another terminal.
[Solution] A system 1 connected with a first and a second terminals 3, 5. When a first questionnaire is displayed on a screen of the first terminal 3 and a second questionnaire, corresponding to the first questionnaire, is displayed on a screen of the second terminal 5, when the second terminal 5 receives information in one answer section 25 of the second questionnaire, the system 1 causes the first terminal 3 to display information regarding a question item 23 corresponding to the one answer section 25.

5 Claims, 5 Drawing Sheets

(56) References Cited

FOREIGN PATENT DOCUMENTS

| | | |
|---|---|---|
| JP | 2012-003667 A | 1/2012 |
| JP | 2014-182716 A | 9/2014 |
| JP | 2016-053773 A | 4/2016 |

OTHER PUBLICATIONS

Written Opinion of International Patent Application No. PCT/JP2021/048761 completed on Feb. 16, 2022 and mailed Mar. 1, 2022 (3 pages).

* cited by examiner

| CUSTOMER INFORMATION 23 | | 25 | NEXT |

1. AGE — 30
30 YEARS OLD  35 YEARS OLD  40 YEARS OLD  45 YEARS OLD  50 YEARS OLD  55 YEARS OLD  60 YEARS OLD

2. YEARLY INCOME — 1,000
10 MILLION  20 MILLION  30 MILLION  40 MILLION  50 MILLION  60 MILLION  70 MILLION

3. FINANCIAL ASSET — 1,000
10 MILLION  100 MILLION  200 MILLION  300 MILLION  400 MILLION  500 MILLION  600 MILLION  700 MILLION  800 MILLION  900 MILLION  1 BILLION

4. AGE OF FAMILY MEMBER
- SPOUSE 30
- CHILD 1 30
- CHILD 2 30
- CHILD 3 30
- CHILD 4 30
- CHILD 5 30

| SPOUSE | CHILD 1 | CHILD 2 | CHILD 3 | CHILD 4 | CHILD 5 |

30 YEARS OLD  35 YEARS OLD  40 YEARS OLD  45 YEARS OLD  50 YEARS OLD  55 YEARS OLD  60 YEARS OLD

5. YEARLY SPENDING — 1,000
10 MILLION  100 MILLION  200 MILLION  300 MILLION  400 MILLION  500 MILLION  600 MILLION  700 MILLION  800 MILLION  900 MILLION  1 BILLION

6. RETIREMENT AGE... 50

PERSON A HAS MADE INPUT IN "HOUSEHOLD SECTION".

SYSTEM THAT CAUSES SHARER TO DETECT INFORMATION REGARDING ANSWER SECTION INPUT DURING SCREEN SHARING

TECHNICAL FIELD

This invention relates to a system that notifies a sharer of information regarding an answer section input during screen sharing.

BACKGROUND ART

Even when a screen content is shared by a plurality of terminals, it is difficult for one sharer to know which part of the screen content is displayed on screens, and thus, there has been a problem of inability of appropriately sharing information between sharers.

Japanese Unexamined Patent Application Publication No. 2016-053773 describes a system that efficiently displays a component that should be shared. There has been publicly known a system that determines whether the component is set for shared display and efficiently displays a component that should be shared. However, there has not yet been known a system that allows a sharer to detect identity of screen displays during screen sharing or a system that notifies a sharer of information regarding an inputted answer section.

Patent Document 1: Japanese Unexamined Patent Application Publication No. 2016-053773

DISCLOSURE OF THE INVENTION

Problems to be Solved by the Invention

It is an object of this invention to provide a system that notifies a sharer of information regarding an inputted answer section.

Solutions to the Problems

There is provided a system with which, when an input is made on one terminal in one answer section of a questionnaire, information regarding a question item corresponding to the above-described answer section is displayed on another terminal.

This invention is based on a knowledge that a presentation and the like can be efficiently performed by notifying a sharer of information regarding an inputted answer section.

This system is connected with a first terminal and a second terminal and has the following aspects.

A questionnaire displayed on the first terminal is a first questionnaire. A questionnaire displayed on the second terminal is a second questionnaire. When an input is made on the second terminal in one answer section of the above-described questionnaire, information regarding a question item corresponding to the above-described answer section is displayed on the first terminal.

In one preferable aspect of this system, the questionnaire displayed on a screen of the first terminal is the questionnaire displayed on a screen of the second terminal by a sharing instruction from the first terminal.

One preferable aspect of this system has the following aspects.

This system is connected to one or a plurality of terminals other than the first terminal or the second terminal. The questionnaire corresponding to the first questionnaire is displayed on a screen of the one or plurality of terminals.

In one preferable aspect of this system, this system is connected to the one or plurality of terminals other than the first terminal or the second terminal. The questionnaire corresponding to the first questionnaire is displayed on the screen of the one or plurality of terminals. Furthermore, when the one or plurality of terminals receive information in one answer section of the questionnaire corresponding to the first questionnaire, the system causes the first terminal to display information regarding the question item corresponding to the one answer section.

One preferable aspect of this system has the following aspects. The first object is a questionnaire having a plurality of question items and a plurality of answer sections corresponding to the plurality of question items. When an input is made on the second terminal in one answer section of the above-described questionnaire, the system causes the first terminal to display information regarding the question item corresponding to the above-described answer section.

Advantageous Effects of the Invention

There is provided a system with which, when an input is made in one answer section of a questionnaire displayed on one terminal, information regarding a question item corresponding to the above-described answer section is displayed on another terminal.

DESCRIPTION OF PREFERRED EMBODIMENTS

The following describes a configuration for embodying the present invention using the drawings. A system 1 according to the present invention is not limited to the configuration described below, but also includes those appropriately modified within a range evident for a person skilled in the art from the configuration below.

<Outline of Information-Processing System>

Figure 1:
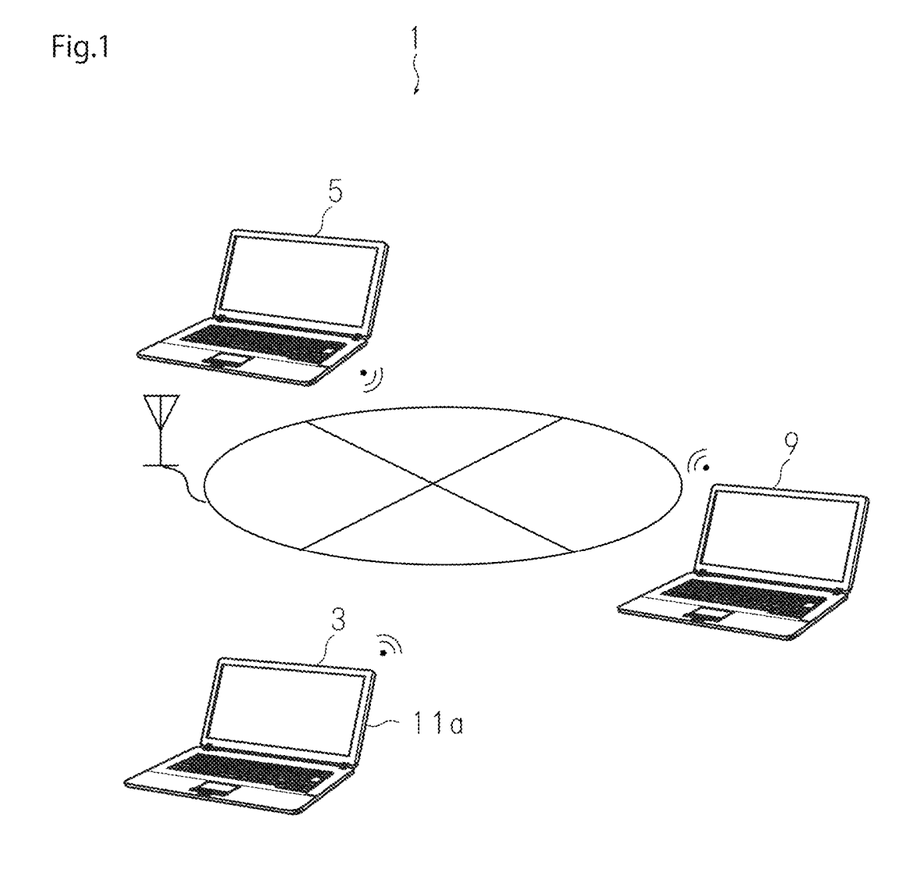
FIG. 1 is a conceptual diagram for describing a configuration of a system according to the present invention.

First, an outline of the system 1 according to the present invention will be described. FIG. 1 is a conceptual diagram for describing a configuration of the system 1 according to the present invention.

As illustrated in FIG. 1, the system 1 according to the present invention is connected with a first terminal 3 and a second terminal 5. Furthermore, the system 1 may be connected with a plurality of terminals (for example, a third terminal 9) having functions equal to those of the above-described terminals besides them. The above-described respective terminals (for example, the first terminal 3 and the second terminal 5) are connected so as to be able to mutually transmit and receive information through an information communication line, such as Internet. Specific examples of the above-described respective terminals include information processing terminals, such as a computer, a tablet terminal, and a smart phone.

This system 1 includes an input-completed answer section specifying unit 11a. The input-completed answer section specifying unit 11a is a component for notifying the first terminal 3 of information regarding a question item 23 corresponding to an answer section 25 of a questionnaire 7 input on a terminal other than the first terminal 3 and displaying the information on a display unit 13a of the first terminal 3.

In view of this, the system 1, when information is input in the answer section 25 of the questionnaire 7 on the terminal other than the first terminal 3, causes the first terminal 3 to display the information regarding the question item 23 corresponding to the answer section 25. At this time, it is preferred that an identification number of the terminal or a user name is displayed on the first terminal 3 for specifying which terminal the above-described input has been input from.

Figure 3:
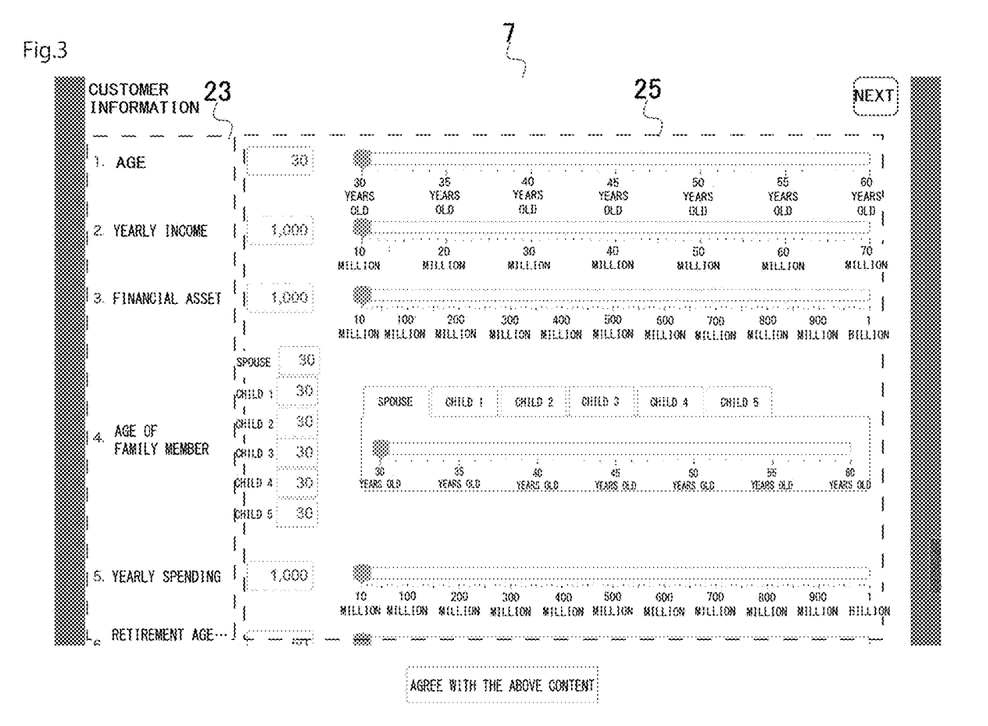
FIG. 3 is a drawing illustrating an exemplary questionnaire displayed on each terminal in the system according to the present invention.

The questionnaire 7 includes the question item 23 representing a question to a user and the answer section 25 for inputting an answer to it. The question item 23 may be one or may be plural for one questionnaire 7. Similarly, the answer section 25 may be one or may be plural for one questionnaire 7. The questionnaire 7 is displayed on a screen of each terminal by an operation of a user of each terminal. Each question item 23 corresponds to any of the answer sections 25. For example, the question item 23 may be a text representing a question content regarding an attribute or a profile of a user or may be represented in word notations. The answer section 25 is an entry field to which a user inputs an answer to a question content of the above-described question item 23. The answer section 25 may be a list box, a text box, a check box, or the like. The questionnaire 7 may be displayed by executing an application program saved in a storage unit or saved and read out as a document file.

(Configurations of First Terminal 3, Second Terminal 5, Third Terminal 9, and Each Terminal)

Figure 2:
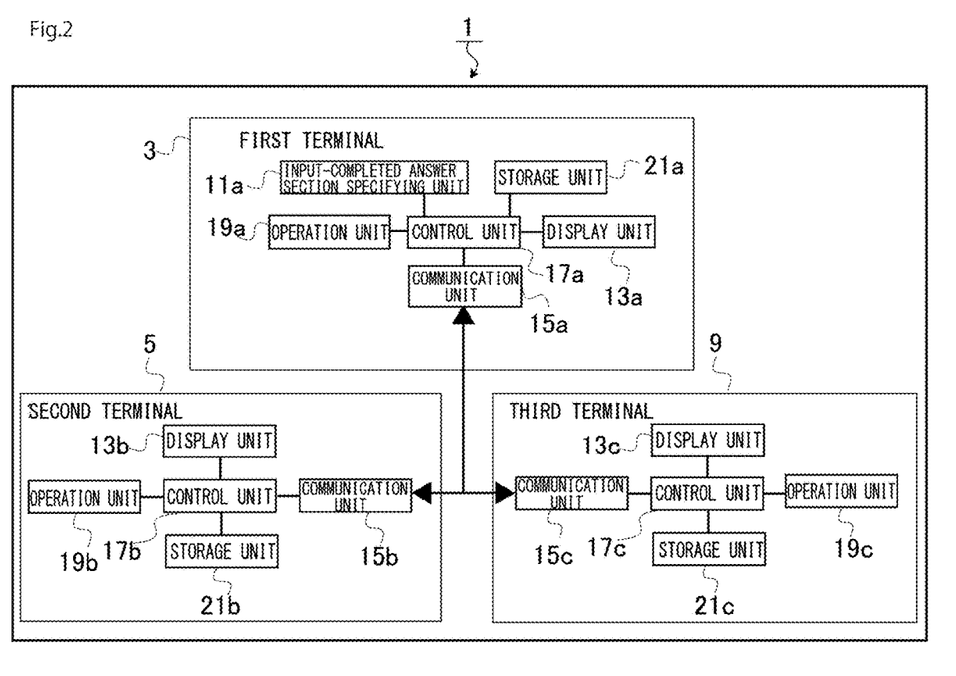
FIG. 2 is a block diagram for describing the system according to the present invention.

Configurations of the first terminal 3, the second terminal 5, the third terminal 9, and each terminal will be described.

As illustrated in FIG. 2, the first terminal 3, the second terminal 5, the third terminal 9, and another terminal connected to the system 1 each include the display unit (for example, 13a, 13b, or 13c), a communication unit (for example, 15a, 15b, or 15c), a control unit (for example, 17a, 17b, or 17c), an operation unit (for example, 19a, 19b, or 19c), and a storage unit (for example, 21a, 21b, or 21c). The first terminal 3 also includes the input-completed answer section specifying unit 11a.

Each component is connected via a bus or the like and configured to be able to transmit and receive information.

Each terminal may have a computer having a calculation unit. For example, the storage unit may store a control program or various kinds of information. When predetermined information is input from the operation unit, the control unit reads out the control program stored in the storage unit. The control unit reads out the information stored in the storage unit as necessary and transmits it to the calculation unit. The control unit also transmits the input information to the calculation unit, as necessary. The calculation unit performs an arithmetic operation using the received various kinds of information and stores it to the storage unit. The control unit reads out the result of the arithmetic operation stored in the storage unit and causes the display unit to display it. Thus, various kinds of processes are executed. Each component described below may correspond to any component of a computer.

(Input-Completed Answer Section Specifying Unit)

The input-completed answer section specifying unit 11a is a component for specifying an answer section corresponding to a question item of the questionnaire 7 input and answered on the terminal connected by the system 1.

The following describes its function. First, by an input to the operation unit 19a by a user, the questionnaire 7 (a first questionnaire) including a plurality of question items and answer sections corresponding to these question items is displayed on the display unit 13a of the first terminal 3.

The above-described questionnaire 7 is displayed also on a terminal other than the first terminal 3 via the communication unit and the control unit. In this respect, it is preferred that from the first terminal 3 to the terminals other than the first terminal 3, the above-described questionnaire 7 is displayed on each terminal via the sharing instruction regarding the questionnaire 7 displayed on each terminal. Here, the sharing instruction is to provide any user an access right to one file and the like. For example, via the above-described process, the questionnaire 7 is displayed on the second terminal 5 as a second questionnaire.

At this time, the above-described questionnaire 7 is not fully displayed in some cases on the display units of the respective terminals for reasons that a display layout of the above-described questionnaire 7 is vertically or laterally long and that a size of the questionnaire 7 on screen is large. In such a case, a user cannot view the whole content of the questionnaire unless the screen is scrolled. Therefore, problems like the following are generated.

For example, assume that there is made an input in an answer section of a terminal other than the first terminal 3 corresponding to an answer section not fully displayed on a display unit 13a of the first terminal 3 among the above-described answer sections displayed on the terminal other than the first terminal 3. Assume that its input content is transmitted to the first terminal 3 via the communication unit and is reflected on the display unit 13a. At this time, the above-described answer section is positioned at a position not fully displayed on the display unit 13a of the first terminal 3 unless, for example, the screen is scrolled, and therefore, a user of the first terminal 3 cannot sense that the above-described input is made in some cases.

Therefore, in the system 1 according to the present invention, it is made possible for the user of the first terminal 3 to sense that the above-described input is made even in the above-described case by employing the following aspect.

Inputs are made in any of the answer sections via the operation unit of the terminal other than the first terminal 3 with the identical questionnaires 7 being displayed on the first terminal 3 and the terminal other than the first terminal 3. At this time, identification information of the above-described question items and answer sections is transmitted to the first terminal 3 via the communication unit from the terminal on which the input has been made. It is preferred that the identification information regarding the terminal on which the above-described input has been made is included in the above-described transmitted content.

Once the above-described information is received in the first terminal 3 via the communication unit, the input-completed answer section specifying unit 11a generates a message and information on a display content for notifying a user of the first terminal 3 of an input position for the above-described answer based on the information.

Figure 4:
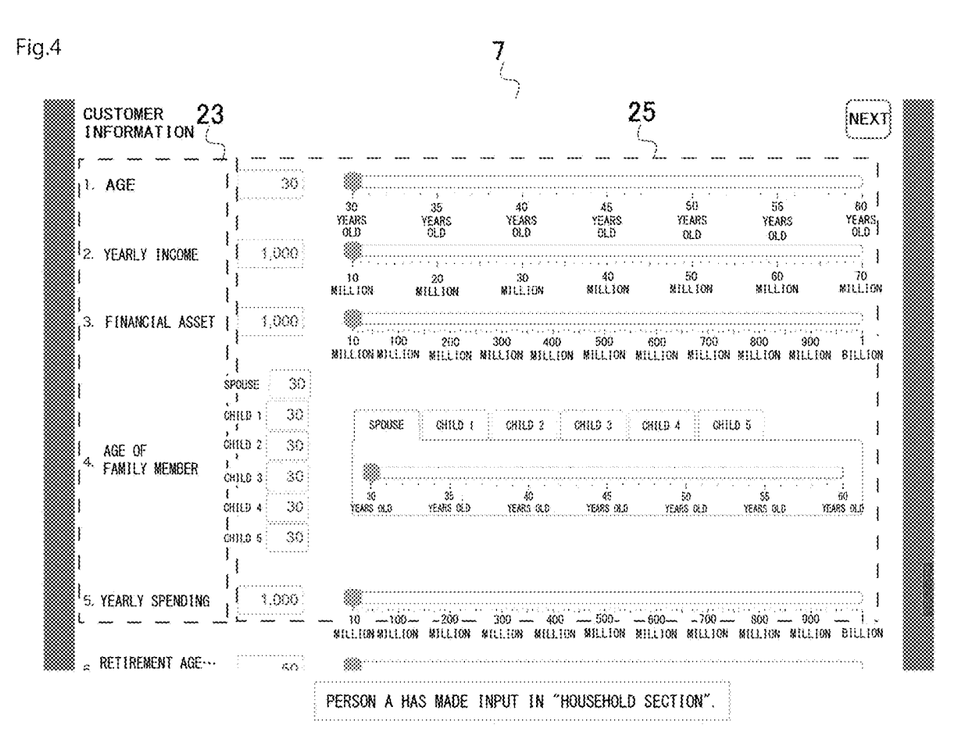
FIG. 4 is a drawing exemplarily illustrating a display content displayed on a first terminal when an input is made in an answer section of a terminal other than the first terminal in the system according to the present invention.

The input-completed answer section specifying unit 11a generates a message and a display content regarding the question item corresponding to the first terminal 3 by specifying the corresponding question item based on the identification number of the inputted answer section. When the user of the second terminal 5 (set as Person A) has made an input in an answer section "household section," these message and display content may be like "Person A has made input in household section." The message and the display content are displayed on the display unit 13a via a control unit 17a of the first terminal 3.

FIG. 4 is a drawing exemplarily illustrating when the user of the terminal other than the first terminal 3 makes an input in any answer section in "household section."

Besides this, when the user of the terminal other than the first terminal 3 makes an input that he or she agrees with the input information in the answer section via the operation unit, a message that indicates the user name and that he or she agrees may be displayed on the display unit 13a of the first terminal 3.

(Display Unit, Communication Unit, Control Unit, and Operation Unit)

The terminal connected to the system 1 (for example, the first terminal 3, the second terminal 5, and the third terminal 9) may basically have the display unit, the communication unit, and the control unit.

The display unit (13a, 13b or 13c) is a component for displaying visual information, such as an image and a moving image. The display unit (13a, 13b, or 13c) may, for example, be various kinds of display devices.

The communication unit (15a, 15b, or 15c) is configured of a communication interface, and has a function for transmitting and receiving information between the respective terminals connected to the system 1. The respective terminals, for example, transmit identification numbers and input contents of the answer sections input on the respective terminals to another terminal, and receive identification numbers and input contents of the answer sections input on another terminal, via this component.

The control unit (17a, 17b, or 17c) is means for controlling each unit, such as transmitting and receiving information, storing information in the storage unit, and controlling the display content to the display unit.

An operation unit (22a, 22b, or 22c) is a component for receiving inputs of operation information from users of the respective terminals described above. The operation information input via the operation unit is transmitted to the control unit and used for controlling each terminal.

Various kinds of keyboards, computer mouses, and touch panels used in known information processing terminals can be employed for the operation unit. The touch panel configuring the operation unit may configure a touch panel display together with the display configuring the display unit.

<1. Operation of Information Process in System 1>

Figure 5:
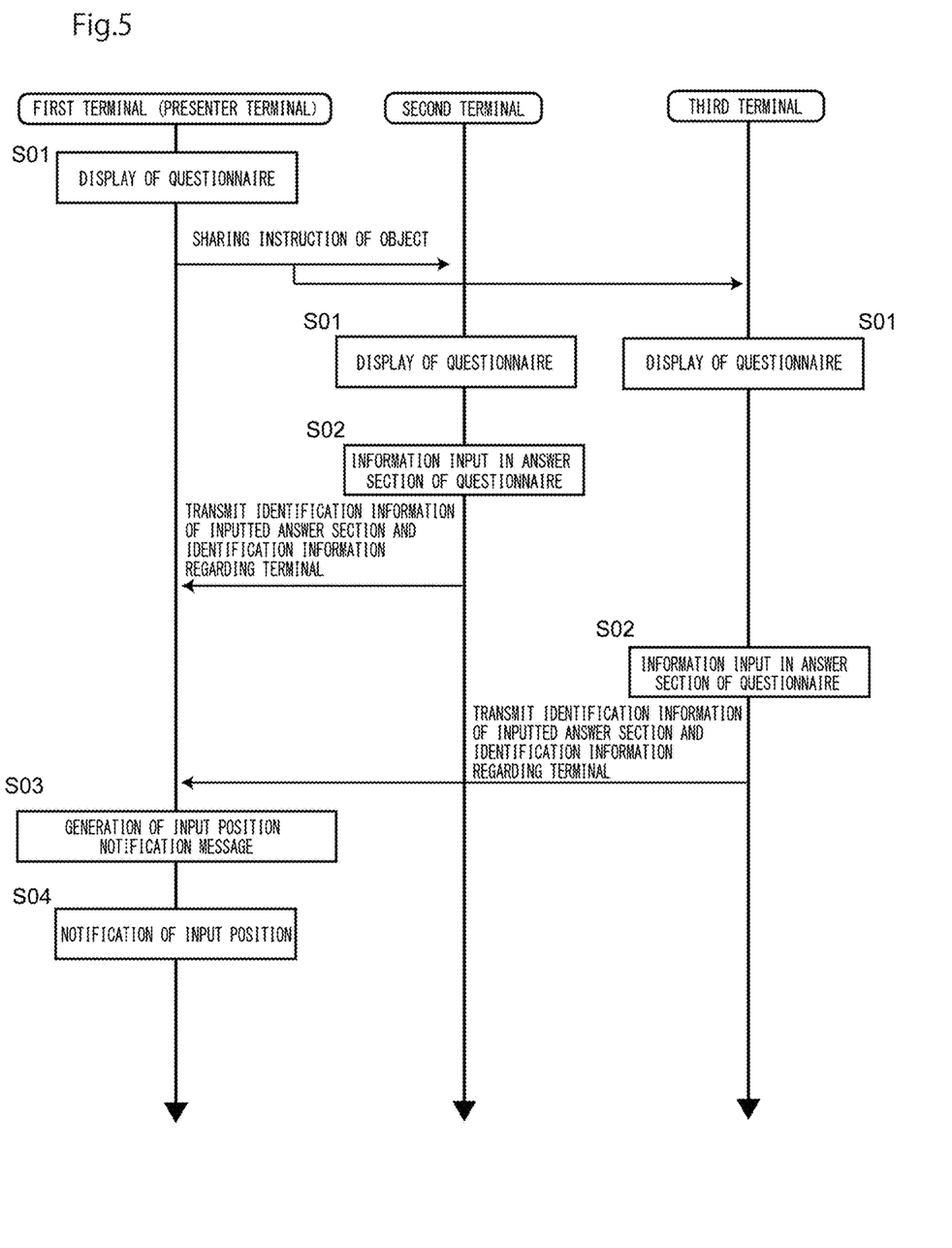
FIG. 5 is a drawing illustrating a flow when a process is performed between three terminals in the system according to the present invention.

In the following example, a description will be given of a case where the process of the system 1 is executed between three terminals, and the questionnaire 7 is displayed on the display units of the first terminal 3, the second terminal 5, and the third terminal 9. FIG. 5 is a drawing illustrating a processing flow when the process is performed between three terminals in the system 1 according to the present invention.

(2-1. Notification of Input Position)

After the input by a user to the operation unit and the sharing instruction described above, the identical questionnaires 7 are displayed on the display units of the first terminal 3, the second terminal 5, and the third terminal 9 (display of questionnaire: S01).

Next, when an input in any of the answer sections of the above-described questionnaire 7 (information input in answer section of questionnaire: S02) is made on the second terminal 5 or the third terminal 9, identification information of the answer section and identification information of the terminal to which the input was made may be transmitted to the first terminal 3. The input position specifying unit 11a of the first terminal 3 generates a message and a display content for notifying a user of the first terminal 3 of the input position of the above-described answer by the above-described method (generation of input position notification message: S03). The message that notifies the input position is displayed on the first terminal 3 (notification of input position: S04).

In the description of this application, the embodiment according to the present invention has been described above with reference to the drawings for achieving the content of the present invention. However, the present invention is not limited to the above-described embodiment, but encompasses modified configurations and improved configurations evident for a person skilled in the art based on the items described in the description of this application.

This description provides a program for causing a computer to function as the above-described system and an information recording medium storing the program. This program is implemented in a computer, and causes the computer to function as a system having means that generates the input position notification message for notifying a user of the information regarding the answer section input in the questionnaire.

INDUSTRIAL APPLICABILITY

This invention can be used in the information communication industry.

DESCRIPTION OF REFERENCE SIGNS

1 . . . system
3 . . . first terminal
5 . . . second terminal
7 . . . questionnaire
9 . . . third terminal
11a . . . input-completed answer section specifying unit
13a . . . display unit
13b . . . display unit
13c . . . display unit
15a . . . communication unit
15b . . . communication unit
15c . . . communication unit
17a . . . control unit
17b . . . control unit
17c . . . control unit
19a . . . operation unit
19b . . . operation unit
19c . . . operation unit
21a . . . storage unit
21b . . . storage unit
21c . . . storage unit
23 . . . question item
25 . . . answer section

The invention claimed is:

1. A system which is connected with a first terminal and a second terminal, wherein
when a questionnaire displayed on a screen of the first terminal is a first questionnaire and a questionnaire corresponding to the first questionnaire displayed on a screen of the second terminal is a second questionnaire,
the first questionnaire has a plurality of question items and a plurality of answer sections corresponding to the respective plurality of question items, and
the second questionnaire has a plurality of question items identical to the question items of the first questionnaire and a plurality of answer sections corresponding to the respective plurality of question items, and
when the second terminal receives information in one answer section of the second questionnaire, the system causes the first terminal to display information regarding the question item corresponding to the one answer section besides the first questionnaire,
wherein the information regarding the question item is content for notifying a user of which of the plurality of answer sections in the second questionnaires an answer is entered in.

2. The system according to claim 1, wherein
the second questionnaire is displayed on a screen of the second terminal by a sharing instruction from the first terminal.

3. The system according to claim 2, wherein
the system is connected to one or a plurality of terminals other than the first terminal or the second terminal, and
the questionnaire corresponding to the first questionnaire is displayed on a screen of the one or plurality of terminals.

4. The system according to claim 3, wherein
when the one or plurality of terminals receive information in one answer section of the questionnaire corresponding to the first questionnaire, the system causes the first terminal to display information regarding the question item corresponding to the one answer section besides the first questionnaire.

5. A program for causing a computer, the computer being connected with a first terminal and a second terminal, wherein
when a questionnaire displayed on a screen of the first terminal is a first questionnaire and a questionnaire corresponding to the first questionnaire displayed on a screen of the second terminal is a second questionnaire,
the first questionnaire has a plurality of question items and a plurality of answer sections corresponding to the respective plurality of question items, and
the second questionnaire has a plurality of question items identical to the question items of the first questionnaire and a plurality of answer sections corresponding to the respective plurality of question items, and
when the second terminal receives information in one answer section of the second questionnaire, the computer causes the first terminal to display information regarding the question item corresponding to the one answer section besides the first questionnaire,
wherein the information regarding the question item is content for notifying a user of which of the plurality of answer sections in the second questionnaires an answer is entered in.

* * * * *